United States Patent Office 2,955,140
Patented Oct. 4, 1960

2,955,140

BIS-TERTIARY GLYCOLS

Bruno Hofer, Munchenstein, Basel Land, and Willy Stoll, Basel, Switzerland, assignors to Geigy Chemical Corporation, New York, N.Y., a corporation of Delaware No Drawing. Filed Dec. 30, 1957, Ser. No. 705,760

Claims priority, application Switzerland Jan. 8, 1957

4 Claims. (Cl. 260—635)

The present invention concerns a process for the production of new bis-tertiary glycols as well as the compounds obtainable by this process which have valuable pharmacological properties.

Bis-tertiary glycols of the general formula:

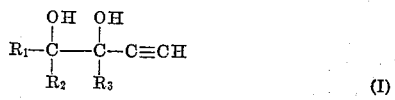

wherein:

$R_1$ represents a primary or secondary alkyl radical having 1 to 5 carbon atoms, an alkenyl radical having 2 to 4 carbon atoms or a cycloalkyl radical having 3 to 7 carbon atoms, $R_2$ represents a primary or secondary alkyl radical having 1 to 4 carbon atoms, and $R_3$ represents an alkyl radical having 1 to 4 carbon atoms, with the proviso that $R_3$ contains more than 1 carbon atom when each of $R_1$ and $R_2$ represents a methyl or ethyl group, and with the further proviso that $R_1$ may not be ethyl when both $R_2$ and $R_3$ are methyl, and $R_3$ may not be methyl when $R_1$ and $R_2$ are both propyl, have not been known up to now. It has now been found that these compounds have excellent hypnotic, anaesthetic, sedative and anti-convulsive activity. They can be used therefore, for the treatment of emotional disturbances, insomnia and epilepsy. They are administered perorally, e.g. in capsules, in doses of 10 to 200 mg. per day for adult persons. In addition, the new compounds are intermediates for the production of other pharmacologically valuable substances.

The production of the glycols defined above is characterised by condensing an α-hydroxy-ketone (α-ketol) of the general formula:

wherein $R_1$, $R_2$ and $R_3$ have the meanings given above, with a mono-metal organic derivative of acetylene, in particular a mono-metal acetylide or an acetylene mono-magnesium halide. In the former case, the condensation is performed, for example, in liquid abs. ammonia or in anhydrous organic solvents such as methylal, diethyl ether or mixtures thereof, formamide, dimethyl sulphoxide or dimethyl formamide. Alkali metal acetylides can be used in particular as mono-metal acetylides. They are formed for example in situ either before the reaction by reacting acetylene with the metals dissolved in ammonia or they are formed during the reaction. In the latter case, for example acetylene is reacted with the α-ketol in an organic solvent in the presence of a finely suspended alkali metal hydroxide under normal or slightly raised pressure, e.g. at 1.0 to 1.33 atmospheres.

As mono-metal organic derivative of acetylene, an acetylene mono-magnesium halide may also be reacted with an α-hydroxy-ketone of the general Formula II defined above in a suitable ether-like solvent such as tetrahydrofurane. A suspension of the Grignard component in tetrahydrofurane is obtained, for example by the addition in portions of a solution of ethylene magnesium bromide in tetrahydrofurane to a saturated solution of acetylene in tetrahydrofurane while continuously introducing acetylene (E. R. H. Jones, L. Skatteböl and M. C. Whiting, J. Chem. Soc 1956, 4765–68). In this case, the further addition of the magnesium compound is only made on completion of the development of ethane and renewed saturation of the reaction mixture with acetylene, so that there is always an excess of acetylene.

The presence of a free hydroxyl group in the ketone component naturally means that at least a molar excess of both the metal acetylide as well as acetylene magnesium halide must be used.

The starting materials of the general Formula II, wherein $R_2$ and $R_3$ are methyl groups are produced from methyl ketones of the formula $R_1$—CO—$CH_3$ with alkali metal acetylides and adding water, for example in the presence of mercury oxide and sulphuric acid, to the resultant ethinyl alkyl methyl carbinols. Also the reaction of α-hydroxycarboxylic acids with methyl lithium as described by Billimoria et al. (J. Chem. Soc., 1951, 3067) can be mentioned.

Furthermore, α-ketols of the general Formula II are also produced from ketones of the formula $R_1$—CO—$R_2$, for example. These are first converted into the corresponding cyanohydrins, the hydroxyl group thereof being protected by acylating or reacting with dihydropyrane or a vinyl ether. The α-acyloxy-, α-tetrahydropyranyloxy- or α-(α'-alkoxy-ethoxy)- alkane carboxylic acid nitriles so obtained can be reacted with alkyl magnesium halides of the formula $R_3$—Mg—halogen, to form imines from which the α-hydroxy-ketones of the general Formula II are obtained by hydrolysis. Examples of such compounds are 4-methyl-4-hydroxy-pentanone-(3), 4-methyl-4-hydroxy-hexanone-(3), 4-ethyl-4-hydroxy-hexanone-(3), 4-methyl-4-hydroxy-heptanone-(3), 4.5 - dimethyl - 4 - hydroxy-hexanone-(3), 4-methyl-4-hydroxy-octanone-(3), 4.5.5-trimethyl-4-hydroxy-hexanone-(3), 3-methyl-3-hydroxy-pentene-(1)-one-(4), 2 - cycloalkyl-2-hydroxy-butanone-(3) and 3-cycloalkyl-3-hydroxy-pentanone-(4).

The following examples further illustrate the production of the new compounds. The temperatures are given in degrees centigrade.

Example 1

100 ml. of abs. ammonia are put into a 350 ml. flask fitted with a condenser, stirrer, toluene thermometer, tube for the introduction of gas and a dropping funnel. The flask is cooled to under —40° in a carbon dioxide/acetone bath, and the following reactions are performed at inner temperatures of between —40° and —50°. First 0.1 g. of crystallised ferric nitrate are added while stirring and then 0.4 g. of sodium. After the colour, which was at first deep blue, has changed to grey, a further 4.6 g. of sodium are added in small pieces. After the blue colour has again changed to grey, the whole is stirred for half an hour. About 5 litres of abs. acetylene are then introduced and then 11.6 g. of 3-methyl-3-hydroxy-hexanone-(2) in 20 ml. of abs. ether are added dropwise within 10 minutes while introducing further acetylene. On completion of the addition of the ketol, the whole is stirred for one hour, acetylene being continuously introduced. The temperature is then raised to about 20° within 10–15 hours, the mass being kept stirrable by the addition of abs. ether.

The reaction mixture is then stirred under reflux for 2 hours, then 50 ml. of saturated ammonium chloride solution are added at 0° and the mixture is hydrolysed whereupon the reaction is made acid to Congo red paper with 50% sulphuric acid. The reaction product is taken up in ether and the ethereal solution is washed until the reaction is neutral, dried over magnesium sulphate and concentrated. On distilling the residue in the vacuum, 3.4-dimethyl-3.4-dihydroxy-heptine-(1) is obtained (B.P.$_{12}$ 95–97°).

Example 2

50 g. of finely pulverised potassium hydroxide are added to 50 ml. of distilled methylal and 50 ml. of abs. diethyl ether in a stirring flask of the same size and fitted with the same equipment as described in Example 1 and, while stirring and cooling the suspension to −10° to 0° inner temperature, abs. acetylene is added until saturation is reached. 13.0 g. of 3.4-dimethyl-3-hydroxy-pentanone-(2) are then added dropwise within 10 minutes while introducing a strong stream of acetylene and the whole is then stirred at the same temperature for two hours while still introducing acetylene. The reaction mixture is then made acid to litmus paper with acetic acid, the ether-methylal layer is separated and the acid, aqueous solution is ethered out. The ether extracts and the ether-methylal layer are washed neutral either separately or together, dried over sodium sulphate and the solvent is removed. On distilling the residue in the vacuum, the 3.4.5-trimethyl-3.4-dihydroxy-hexine-(1) passes over at 98–99° under 13 mm. pressure.

Example 3

(a) 7.2 g. of vinyl ethyl ether are added to 11.3 g. of n-propylmethyl-ketone cyanohydrin, 3–5 drops of ethereal hydrochloric acid solution are then added whereupon considerable heat is generated. After leaving to stand for 1 hour, the reaction solution is neutralised with anhydrous sodium carbonate and the inorganic salts are filtered off.

(b) Ethyl magnesium bromide obtained from 2.9 g. of magnesium and 15 g. of ethyl bromide in 50 ml. of ether is placed in a 350 ml. flask fitted with a condenser, thermometer, dropping funnel and tube for the introduction of nitrogen. The ethereal solution of α-methyl-α-(α′-ethoxy-ethoxy)-valeronitrile obtained under (a) is added drop-wise in a nitrogen atmosphere while stirring and gently refluxing the ether, and the reaction mixture is then stirred for 5 hours at the boiling temperature of the ether. 50 ml. of water are then added while cooling with ice and the reaction is made acid to Congo red paper with 50% sulphuric acid. The organic portions are then distilled off until the boiling point is 60° and the remaining solution is stirred for 10–15 hours in a bath of 80°. After cooling, it is ethered out, the ether extract is washed neutral, dried over sodium sulphate and the solvent is evaporated off. The residue is distilled in the vacuum. After rectifying twice, 4-methyl-heptanol-(4)-one-(3) is obtained, B.P.$_{12}$ 70–71°.

(c) 50 ml. of distilled methylal and 50 ml. of abs. diethyl ether are placed in a 350 ml. flask fitted with a condenser, stirrer, thermometer, tube for the introduction of gas and a dropping funnel. 50 g. of finely pulverised potassium hydroxide are added and abs. acetylene is added while stirring and cooling to an inner temperature of −10° to 0° until the suspension is saturated. 13.0 g. of 4-methyl-4-hydroxy-heptanone-(3) (B.P.$_{12}$ 70–71°) is added dropwise within 10 minutes under stronger introduction of acetylene and then the whole is stirred for another two hours while still introducing acetylene. The reaction mixture is then made acid to litmus paper with acetic acid, the ether/methylal layer is separated and the acid aqueous solution is extracted with ether. The ether extracts and the ether/methylal phase are combined and washed neutral, dried over sodium sulphate and the solvents are removed. On distilling the residue in the vacuum, 3-ethyl-4-methyl-3.4-dihydroxy-heptine-(1) passes over at 105–106° under 12 mm. pressure.

3-ethyl-4-methyl-3.4-dihydroxy-pentine-(1) (B.P.$_{15}$ 88–89°) is obtained in an analogous manner starting from acetone cyanohydrin.

Example 4

9.9 g. of methyl-ethyl ketone cyanohydrin with 20 ml. of distilled acetic anhydride and 0.5 ml. of acetyl chloride are heated in a water bath to about 50–60° and then left to stand for half an hour. The excess acetic anhydride and the acetyl chloride are then distilled off in the vacuum and the residue is rectified. α-Methyl-α-acetoxy-butyronitrile passes over at 74–76° under 12 mm. pressure.

An ethereal solution of 14.1 parts of this compound is used in the Grignard reaction described in Example 1 instead of the solution of α-methyl-α-(α′-ethoxy-ethoxy)-valero-nitrile. 3-ethyl-4-methyl-3.4-dihydroxy-hexine-(1) (B.P.$_{12}$ 97–98°; M.P. 33–35°) is obtained therefrom as described in Examples 3 (b) and (c).

Example 5

5 drops of ethereal hydrochloric acid solution are added to 11.3 g. of diethyl ketone cyanohydrin and 8.4 g. of dihydropyrane whereupon heat is generated. After standing for 10–15 hours at room temperature, the reaction solution is diluted with ether, shaken with bicarbonate solution, dried over sodium sulphate and the ether is removed. On distilling the residue in the vacuum α-ethyl-α-tetrahydropyranyloxy-butyro-nitrile (B.P.$_{11}$ 110–114°) is obtained.

An ethereal solution of 19.7 g. of this compound is used in the Grignard reaction according to Example 3 (b) and the reaction product is reacted further as described under (c). 3.4-diethyl-hexine-(1)-diol-(3.4) (B.P.$_{12}$ 106–107°; M.P. 36–38°) is obtained in this way.

Example 6

100 ml. of abs. ammonia are placed in a 350 ml. flask fitted with a stirrer, condenser, toluene thermometer, tube for the introduction of gas and a dropping funnel, and the flask is placed in a carbon dioxide/acetone bath at under −40°. The following reactions are performed at an inner temperature of between −40 and −50°. First, 0.1 g. of crystallised ferric nitrate and then 0.4 g. of sodium are added while stirring. After the deep blue colour of the reaction mixture has changed to grey, a further 4.6 g. of sodium are added in small pieces. When the colour has once more changed from blue to grey, the whole is stirred for half an hour. Then about 5 liters of acetone-free, abs. acetylene are introduced whereupon 12.8 g. of 2-cyclopropyl-2-hydroxy-butanone-(3) (produced from cyclopropyl-methyl-ethinyl carbinol by the usual addition of water in the presence of mercury oxide and sulphuric acid; B.P.$_{11}$ 60°) in 20 ml. of abs. ether are added dropwise within 15 minutes under continuous introduction of acetylene. On completion of the ketol addition, the whole is stirred for 1 hour while continually introducing acetylene.

20 g. of solid ammonium chloride are added in five portions to the reaction mixture and the temperature is allowed to rise to about 20° within 10–15 hours, the mass being kept stirrable by the addition of acetone. The inorganic salts are then dissolved by the addition of the necessary amount of water and, after washing the organic phase until it has a neutral reaction and drying over sodium sulphate, the organic phase is concentrated. The residue is distilled in a water jet vacuum and the fraction which passes over at B.P.$_{11}$ 97–104° is rectified by means of a good column. 3-methyl-4-cyclopropyl-3.4-dihydroxy-pentine-(1) is obtained. B.P.$_{10}$ 103°. It has also an excellent analgetic action in addition to a good hypnotic action.

3-methyl-4-cyclopentyl-3.4-dihydroxy-pentine-(1) and 3-methyl-4-cyclohexyl-3.4-dihydroxy-pentine-(1) are obtained in an analogous manner.

Example 7

100 ml. of abs. ammonia are placed in a flask exactly the same as that described in Example 1. First 0.1 g. of crystallised ferric nitrate and then 0.2 g. of pure lithium metal are added at −40 to −50° inner temperature. After the colour has changed from deep blue to grey, 1.4 g. of lithium are added in small pieces having a blank surface. The whole is stirred for half an hour and then 5 litres of abs. acetone-free acetylene gas are introduced. 14.4 g. of 3.5-dimethyl-3-hydroxy-hexanone-(2) (B.P.$_{12}$ 91–92°) in 20 ml. of abs. ether are added dropwise within 10 minutes while introducing acetylene. On completion of the ketol addition, the reaction mixture is stirred for 1 hour while continually introducing acetylene. After adding 15 g. of solid ammonium chloride, the inner temperature is allowed to rise gradually to about 20°, the reaction mass being kept stirrable by the addition of ether.

The ethereal solution is drawn off under suction from the crystalline product and the residue is well washed with ether. The ethereal solution is washed with salt solution, diluted sulphuric acid, saturated bicarbonate solution and salt solution until it is neutral, dried over sodium sulphate and concentrated on a water bath. Distillation of the residue in the vacuum produces 3.4.6-trimethyl 13.4-dihydroxy-heptine-(1) (B.P.$_{12}$ 116–117°). The distillate solidifies and can be recrystallised from ether/pentane whereupon colourless, nice smelling crystals are obtained which melt at 41–43°.

4.6-dimethyl-3-ethyl-3.4-dihydroxy-heptine-(1) is obtained in an analogous manner.

*Example 8*

A solution of ethyl magnesium bromide in tetrahydrofurane is produced in the usual way from 7.0 g. of magnesium filings, 32.0 g. of distilled ethyl bromide and 200 ml. abs. tetrahydrofurane while introducing nitrogen. The Grignard solution is decanted, while still warm and in an inert atmosphere, into a dropping funnel fitted to a dry stirring flask of 1½ litre capacity which is fitted with condenser, stirrer, thermometer and tube for introducing acetylene. 120 ml. of abs. tetrahydrofurane are poured into the flask and acetylene gas in introduced while continually stirring until saturation is reached. Whilst still introducing acetylene, the Grignard solution is dropped in in about 5 ml. portions which causes the reaction mixture to foam strongly each time. On completion of the addition, the reaction mixture is saturated with acetylene at 25° and a suspension of ethinyl magnesium bromide in tetrahydrofurane which can be stirred easily is obtained on cooling in an ice bath.

The solution of 14.4 g. of 3-methyl-3-hydroxy-heptanone-(4) (B.P.$_{12}$ 70–71°) in 15 ml. of abs. tetrahydrofurane is then added dropwise within half an hour while cooling with ice. The introduction of acetylene is discontinued and the contents of the flask are stirred for about 12-15 hours at room temperature (about 20°). Ammonium chloride is then added for decomposition in the usual way and the residue, freed from tetrahydrofurane, is distilled in the vacuum whereupon 3-methyl-4-ethinyl-3.4-dihydroxy-heptane is obtained which boils at 105–108° under 12 mm. pressure.

3-methyl-4-ethinyl-3.4-dihydroxy-octane (B.P.$_{12}$ 117–120°) is obtained in an analogous manner from 3-methyl-3-hydroxy-octanone-(4) (B.P.$_{12}$ 85–86°) after ethinylation by one of the methods described above.

Also, on ethinylation of 3.5-dimethyl-3-hydroxy-hexene-(4) (B.P.$_{11}$ 76–78°), 3.4.6-trimethyl-3.4-dihydroxy-heptene-(5)-ine-(1) (B.P.$_{11}$ 102–105°) is obtained and 3.4-dimethyl-3.4-dihydroxy-hexene-(5)-ine-(1) is obtained from 3-methyl-3-hydroxy-pentene-(4)-one-(2).

What we claim is:

1. A bis-tertiary glycol selected from the group consisting of the compounds of the formulae

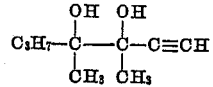

and

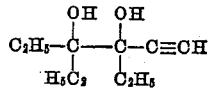

and

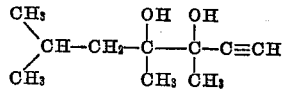

2. The compound of the formula:

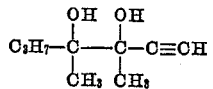

3. The compound of the formula:

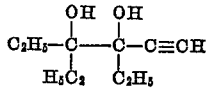

4. The compound of the formula:

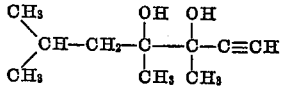

References Cited in the file of this patent

Cologne et al.; Chem. Abstracts, vol. 39 (1945), col. 697 (1 page).